(12) United States Patent
Deangelis et al.

(10) Patent No.: US 7,771,156 B2
(45) Date of Patent: Aug. 10, 2010

(54) METHOD AND APPARATUS FOR REACTOR MONOLITH LOADING

(75) Inventors: Gilbert Deangelis, Lindley, NY (US); Jerome T Firlik, Big Flats, NY (US); Michael G Shultz, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 2054 days.

(21) Appl. No.: 10/670,865

(22) Filed: Sep. 25, 2003

(65) Prior Publication Data
US 2005/0084058 A1 Apr. 21, 2005

(51) Int. Cl.
*G21C 19/00* (2006.01)
(52) U.S. Cl. ............... 414/808; 414/146; 376/268
(58) Field of Classification Search .............. 414/146, 414/173, 180; 193/35 A; 376/219, 264, 376/268
See application file for complete search history.

(56) References Cited

U.S. PATENT DOCUMENTS

| | | | | |
|---|---|---|---|---|
| 3,190,806 | A * | 6/1965 | Mangieri et al. | 376/268 |
| 3,293,136 | A * | 12/1966 | Harris | 376/264 |
| 3,775,246 | A * | 11/1973 | Frisch et al. | 376/263 |
| 3,978,957 | A * | 9/1976 | Hoffmeister | 193/1 |
| 4,238,455 | A | 12/1980 | Ogiwara | 422/171 |
| 4,281,691 | A * | 8/1981 | Goutard et al. | 141/1 |
| 4,311,557 | A * | 1/1982 | Kowalski et al. | 376/271 |
| 4,330,369 | A * | 5/1982 | Anderson | 376/268 |
| 4,627,526 | A * | 12/1986 | Masciarelli | 193/35 A |
| 4,678,624 | A * | 7/1987 | Lahr et al. | 376/261 |
| 4,715,111 | A * | 12/1987 | Kapoor et al. | 29/723 |
| 4,755,347 | A * | 7/1988 | Tolmie | 376/272 |
| 4,796,746 | A * | 1/1989 | Bergstrom et al. | 198/463.4 |
| 5,009,856 | A | 4/1991 | Fenger et al. | 422/178 |
| 5,347,554 | A * | 9/1994 | White et al. | 376/260 |
| 6,005,143 | A | 12/1999 | Machado et al. | |
| 6,327,320 | B1 * | 12/2001 | Hunter | 376/260 |
| 6,773,219 | B2 * | 8/2004 | Burner | 414/146 |
| 2009/0123255 | A1 * | 5/2009 | Waisanen | 414/146 |

FOREIGN PATENT DOCUMENTS

| | | |
|---|---|---|
| EP | 0 226 306 | 5/1991 |
| GB | 2 103 953 | 3/1983 |

* cited by examiner

*Primary Examiner*—Saúl J Rodríguez
*Assistant Examiner*—Joshua I Rudawitz
(74) *Attorney, Agent, or Firm*—Susan S. Wilks; Joseph M. Homa; Robert L. Carlson

(57) ABSTRACT

A method for delivering a plurality of reactor monoliths into an interior of a reactor includes providing at least one tubular member having an outer wall defining an interior space adapted to allow sliding movement of reactor monolith therethrough, and providing a plurality of engagement members located within the interior space of the at least one tubular member and spaced along a length thereof, wherein each engagement member is actuable between an extended position and a retracted position. The at least one tubular member is extended into an interior of a reactor such that a first end of the at least one tubular member is located near an opening in the reactor, and a second end of the at least one tubular member is insert into the interior of the reactor. The plurality of engagement members may be controlled such that each engagement member actuates between the extended position, thereby preventing sliding movement of the monolith through the tube, and the retracted position, thereby allowing the monolith to slide past the engagement member within the tube.

6 Claims, 4 Drawing Sheets

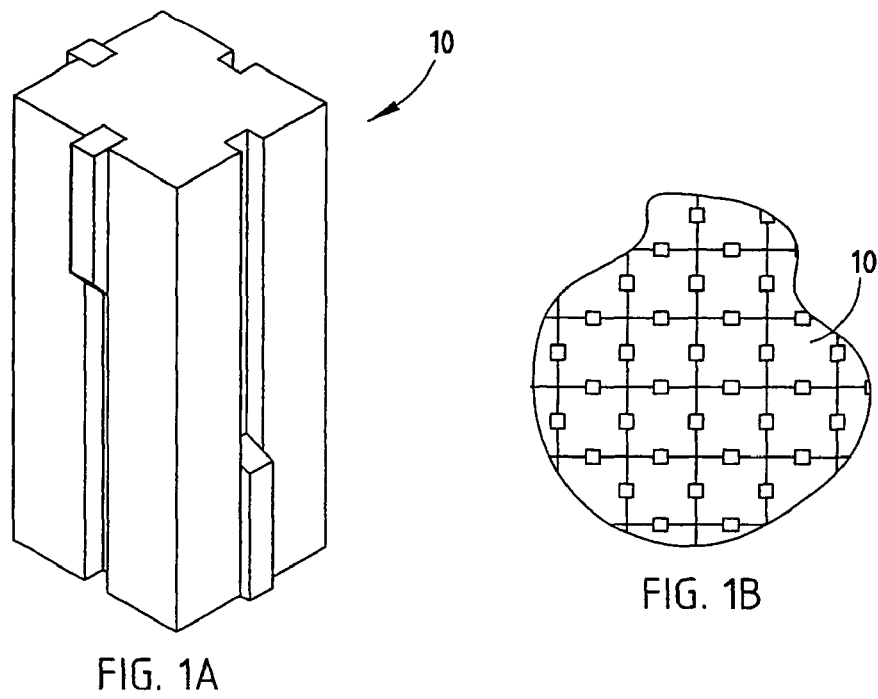
FIG. 1A
FIG. 1B
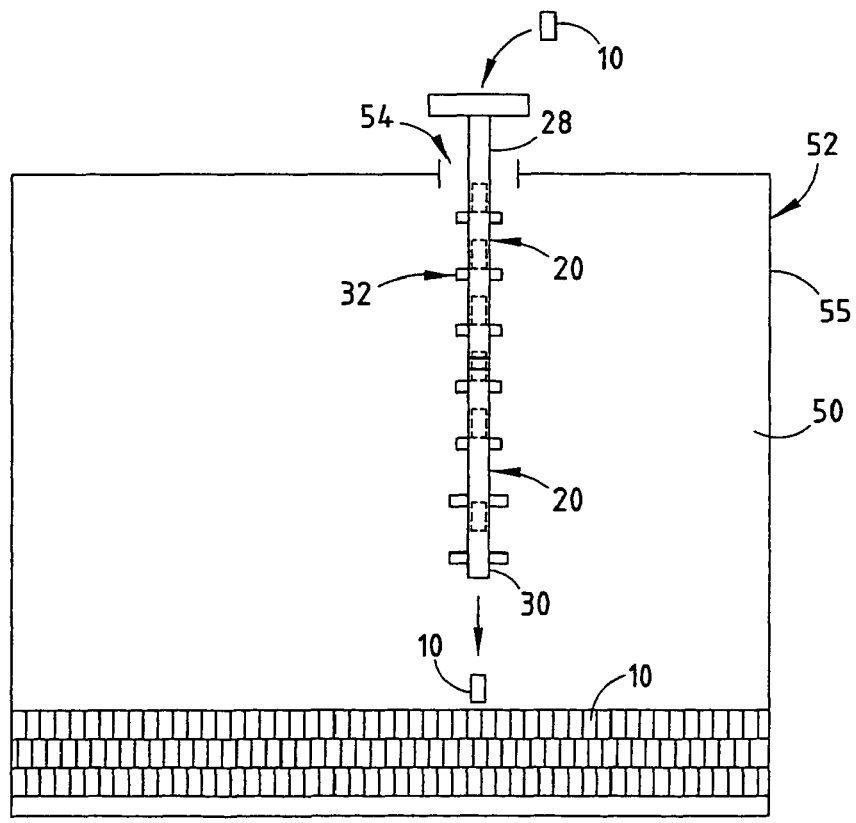
FIG. 2

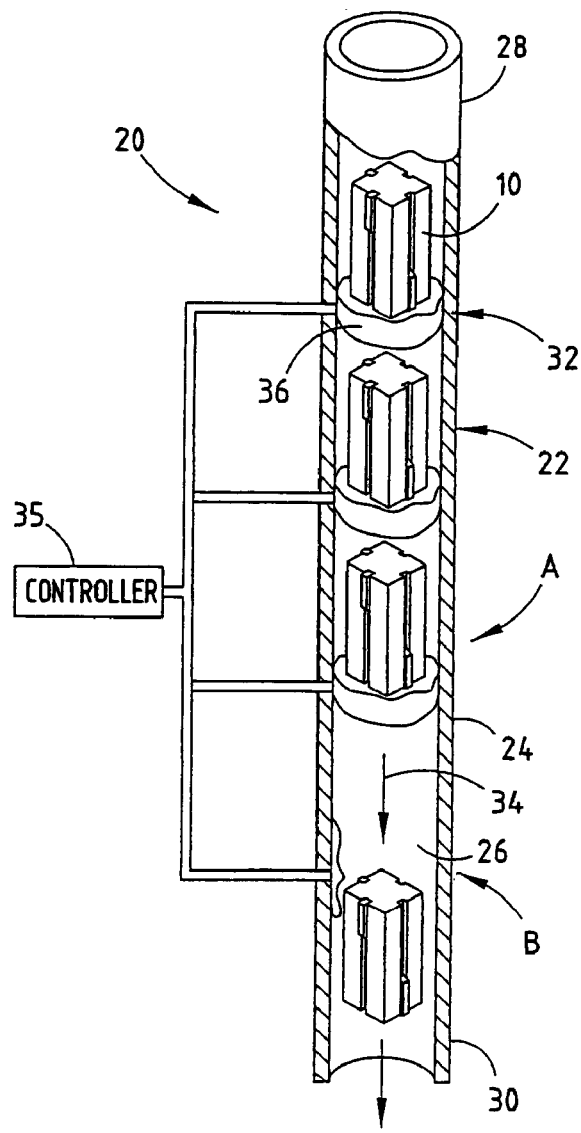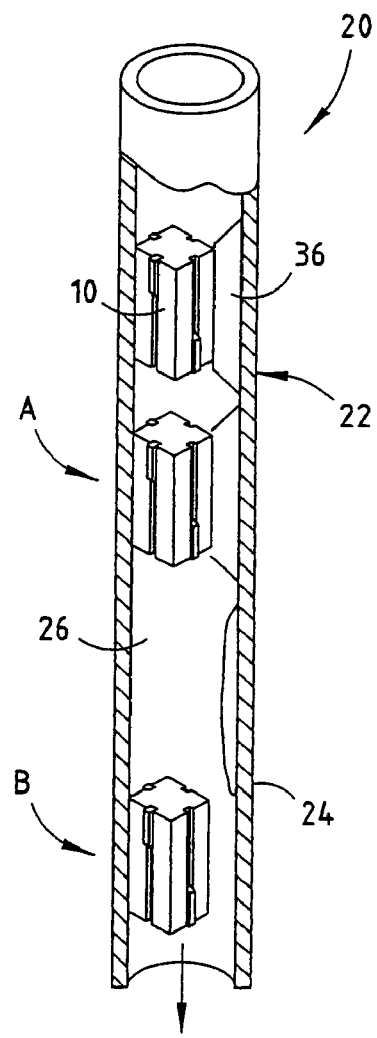
FIG. 3
FIG. 4

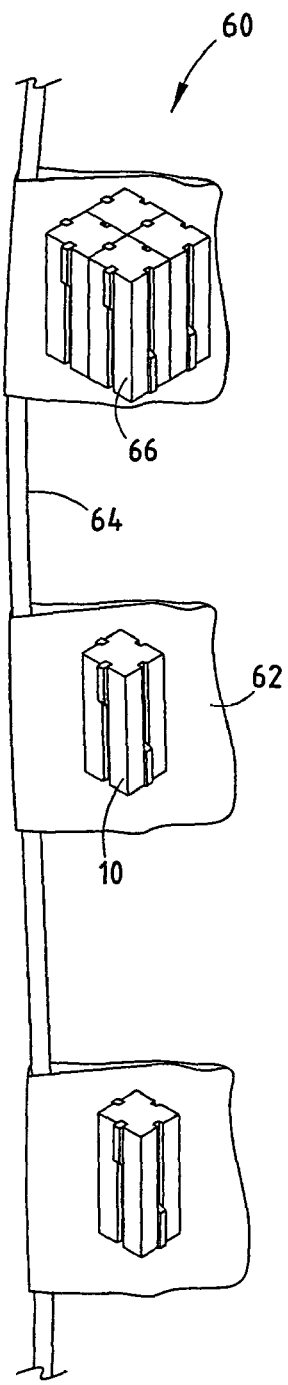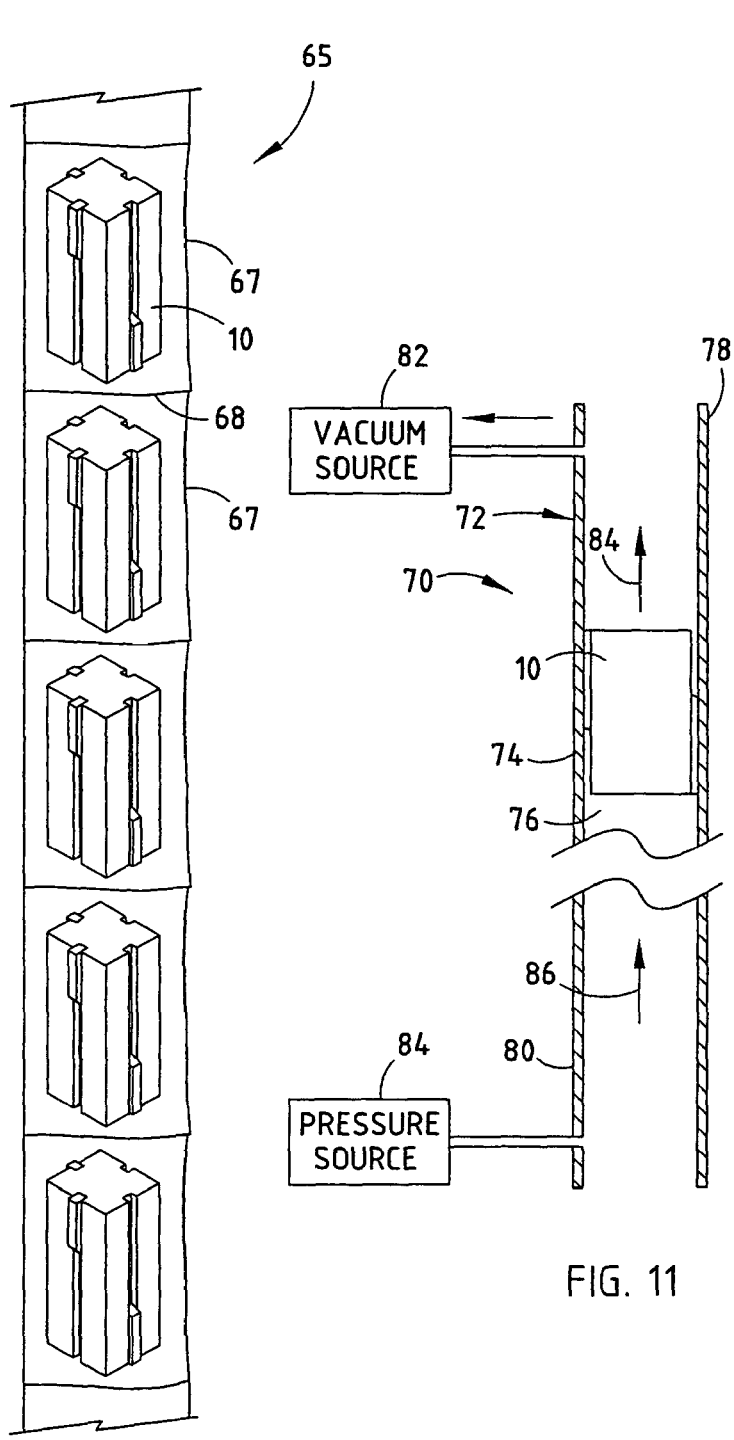
FIG. 9
FIG. 10
FIG. 11

METHOD AND APPARATUS FOR REACTOR MONOLITH LOADING

BACKGROUND OF THE INVENTION

The present invention relates to the delivery of reactor monoliths, and in particular to methods and related apparatus for the delivery of reactor monoliths into an interior space of a reactor.

Reactor monoliths are utilized in a wide variety of applications including large scale trickle bed reactors for chemical and petroleum refining processes. These reactors typically include housings or structures of significantly large dimension, e.g., twelve feet in diameter and fifty feet in height, having a single opening allowing entry into the reactor. A catalyst is placed within the reactor in the form of beads, and the like, which is typically loaded into the interior of the reactor by extending a "sock" through the single opening and "blowing" the catalyst along the sock. A gravity forced loading procedure is also used. An operator located within the interior space of the reactor directs a free end of the sock to spread the catalyst about the reactor. Another known method for loading the catalyst into the reactor includes use of large cranes to lower wire baskets filled with the beads.

As is known, preformed reactor monoliths 10 (FIG. 1) provide significant hydrodynamic advantages to blown in or dumped in beads. These reactor monoliths come in a wide variety of geometrical configurations and sizes, some of which allow the interlocking placement thereof, as best illustrated in FIG. 2. However, as many of these preformed monoliths are constructed of ceramics or other similarly fragile materials, it is difficult to use current methods of delivery to deliver the monoliths into an associated reactor without imparting significant damage thereto.

A method/apparatus is desired that allows efficient and economical delivery of preformed reactor monoliths into the interior space of a reactor that simultaneously eliminates or reduces damage thereto.

SUMMARY OF THE INVENTION

One aspect of the present invention is a method for delivering a plurality of reactor monoliths into an interior of a reactor that includes providing at least one tubular member having an outer wall defining an interior space adapted to allow sliding movement of a reactor monolith therethrough, and providing a plurality of engagement members located within the interior space of the at least one tubular member and spaced along a length thereof, wherein each engagement member is actuable between an extended position and a retracted position. The at least one tubular member is extended into an interior of a reactor such that a first end of the at least one tubular member is located near an opening in the reactor and a second end of the at least one tubular member is inserted into the interior of the reactor. The plurality of engagement members is controlled such that each engagement member actuates between the extended position, thereby preventing sliding movement of the monolith through the tube, and a retracted position, thereby allowing the monolith to slide past the engagement member within the tube.

Another aspect of the present invention is an apparatus for delivery of reactor monoliths into an interior space of a reactor that includes at least one tubular member having an outer wall defining an interior space adapted to allow sliding movement of a reactor monolith therethrough, a first end adapted to be located near an opening in a reactor, and a second end adapted to be inserted into an interior space of the reactor. A plurality of engagement members are located within the interior space of the at least one tubular member and spaced along a length thereof, each engagement member being actuable between an extended position, wherein the engagement member extends into the interior space and is adapted to prevent sliding movement of the monolith through the tube, and a retracted position, wherein the engagement member is retracted towards the outer wall, thereby allowing the monolith to slide past the engagement member within the tube. A controller is operably coupled to the engagement members for controlling the members in a sequential manner, thereby allowing the monolith to be slowly moved along the length of the tube and preventing a continuous free-fall descent.

Yet another aspect of the present invention is a method of packaging reactor monoliths to facilitate the delivery thereof into an interior space of a reactor including packaging at least one reactor monolith into a container, and connecting a plurality of containers in a linear fashion, thereby creating a chain of linked-together containers and allowing the chain of containers to be lowered into an interior space of a reactor.

The methods and related apparatus of the present invention allows efficient and economical delivery of preformed reactor monoliths into the interior space of a reactor while reducing or eliminating damage to the monoliths. Specifically, the present inventive methods reduce costs associated with the installation and removal of the monoliths, while the apparatus may be operated by even unskilled workers, can be easily and quickly adjusted, are capable of a long operating life, and are particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 1A is a top perspective view of a reactor monolith;

FIG. 1B is a top plan view of a plurality of assembled reactor monoliths;

FIG. 2 is a cross-sectional side view of a large-scale, bed-type reactor;

FIG. 3 is a partially schematic, top perspective view of a first embodiment of a delivery apparatus of the present invention, wherein a portion of a tubular member is cut away;

FIG. 4 is a top perspective view of a second embodiment of the delivery apparatus of the present invention, wherein a portion of a tubular member is cut away;

FIG. 9 is a perspective view of a fifth embodiment of the delivery apparatus of the present invention;

FIG. 10 is a perspective view of a sixth embodiment of the delivery apparatus of the present invention; and FIG. 11 is a partially schematic, cross-sectional side view of a seventh embodiment of a delivery apparatus of the present invention, wherein a portion of a tubular member is cut away.

DETAILED DESCRIPTION OF THE PREFERRED EMBODIMENTS

Figure 5:
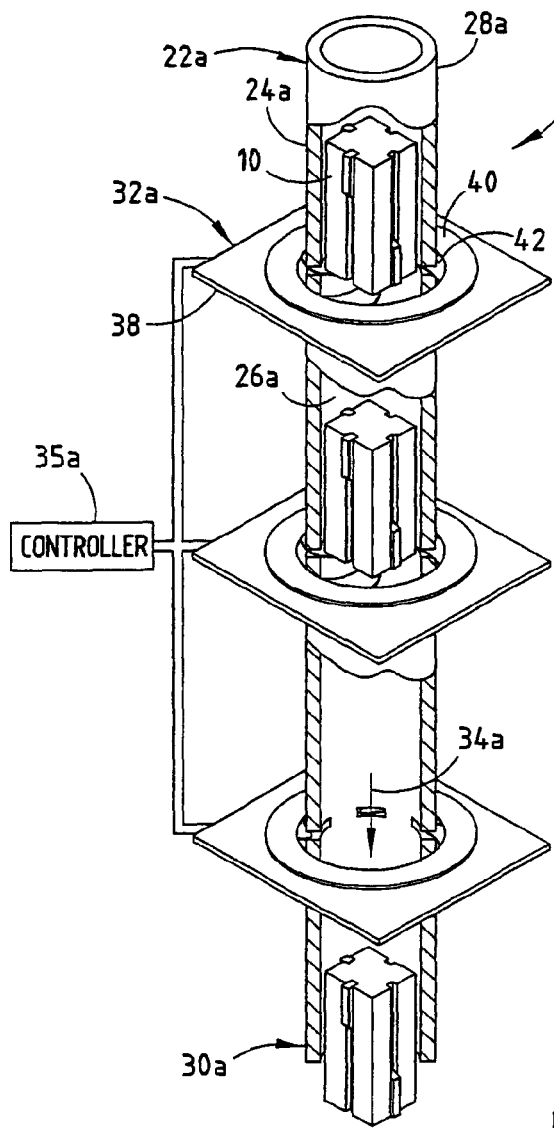
FIG. 5 is a partially schematic, top perspective view of a third embodiment of a delivery apparatus of the present invention, wherein a portion of a tubular member is cut away.

For purposes of description herein, the terms "upper," "lower," "right," "left," "rear," "front," "vertical," "horizontal," and derivatives thereof shall relate to the invention as oriented in FIGS. 3-5, 8 and 11. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 20 (FIGS. 2 and 3) generally designates a reactor monolith delivery apparatus embodying the present invention. In the illustrated example, the apparatus includes a tubular member 22 having a cylindrically-shaped outer wall 24 defining an interior space 26, a first end 28 and a second end 30. The delivery apparatus 20 further includes a plurality of engagement members 32 located within the interior space 26 of the tubular member 22 and spaced along a length of the tubular member 22. Each engagement member 32 is actuable between an extended position (A), wherein the engagement member 32 extends into the interior space 26 of the tubular member 22 and prevents sliding movement of the monolith 10 through the tubular member 22 in a direction as indicated by directional arrow 34, and a retracted position (B), wherein the engagement member 32 is retracted towards the outer wall 24, thereby allowing the monolith 10 to slide past the engagement member 32 within the tubular member 22. The delivery apparatus 20 further includes a controller 35 operably coupled to the engagement members 32 for controlling the engagement members in a sequential manner, thereby allowing the monolith 10 to be slowly moved along the length of the tubular member 22 and preventing a continuous free-fall decent thereof, as discussed below.

In the illustrated example, each engagement member 32 includes an expandable bladder 36 that extends across a substantial portion of the interior space 26 within the tubular member 22 to prevent movement of the monolith 10 along the length of the tubular member 22. In this configuration, an underside of the monolith 10 rests on the bladder 36 when the bladder 36 is in the inflated condition.

Alternatively, the delivery apparatus 20 (FIG. 4) is configured such that the bladder 36 abuts a side of the monolith 10 when in the inflated condition, thereby trapping the monolith 10 between the tubular member 22 and the inflated bladder 36. Similar to as described above, when in the deflated condition, the bladder 36 collapses against the outer wall 24 of the tubular member 22, thereby allowing passage of the monolith 10 along the tubular member 22. However, the bladder 36 can be of other configurations, for example, those which surround the monolith 10 entirely or almost entirely, as long as the bladder configuration is successful in trapping the monolith 10.

Figure 7:
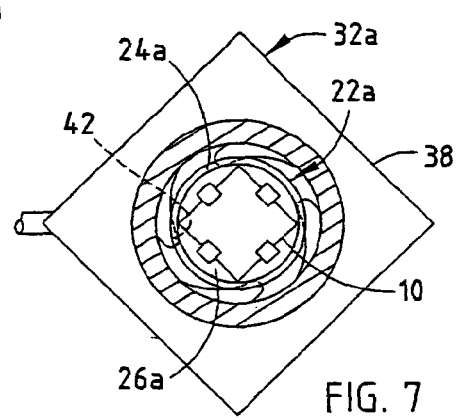
FIG. 7 is a top plan view of the third embodiment of the delivery apparatus, wherein the plurality of teeth are shown in a retracted position.
Figure 6:
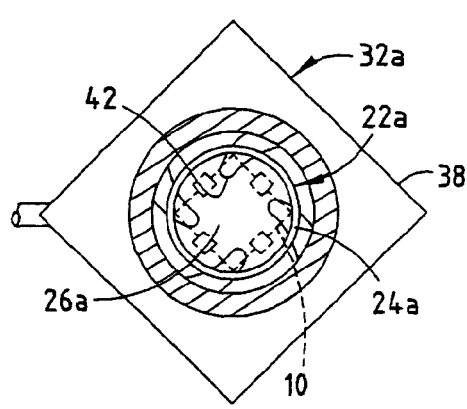
FIG. 6 is a top plan view of the third embodiment of the delivery apparatus, wherein a plurality of teeth are shown in an extended position.
Figure 8:
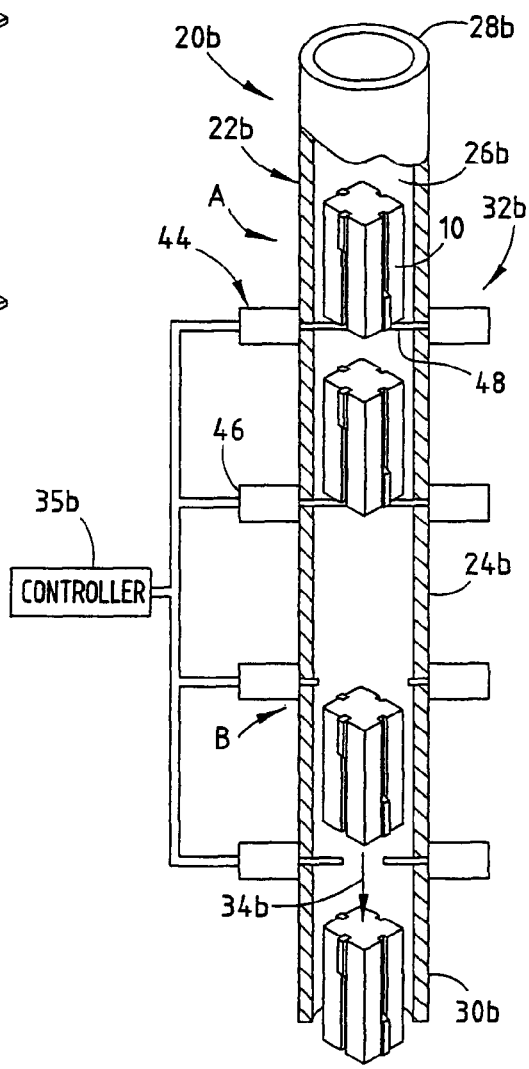
FIG. 8 is a partially schematic, top perspective view of a fourth embodiment of the delivery apparatus of the present invention, wherein a portion of a tubular member is cut away.

The reference numeral 20a (FIG. 5) generally designates another embodiment of the reactor monolith delivery apparatus of the present invention. Since the delivery apparatus 20a is similar to the previously-described delivery apparatus 20, similar parts appearing in FIG. 5 and FIG. 3 respectively are represented by the same, corresponding reference numeral, except for the suffix "a" in the numerals of the latter. In the illustrated example, the engagement member 32a of the delivery apparatus 20a includes an iris-type escapement assembly 38. Each escapement assembly 38 includes an actuator 40 having a plurality of teeth 42 actuable between an extended position (FIG. 6), wherein at least a portion of each of the teeth 42 extend into the interior space 26a of the tubular member 22a a sufficient amount so as to prevent passage of the monolith 10 beyond the escapement assembly 38 in the downward direction 34a, and a retracted position (FIG. 7), wherein the teeth 42 are retracted in close proximity to or withdrawn through apertures in the outer wall 24a of the tubular member 22a, thereby allowing passage of the monolith 10 past the escapement assembly 38.

The reference numeral 20b (FIG. 8) generally designates another embodiment of the reactor monolith delivery apparatus of the present invention. Since the delivery apparatus 20b is similar to the previously-described delivery apparatus 20, similar parts appearing in FIG. 8 and FIG. 3, respectively, are represented by the same, corresponding reference numeral, except for the suffix "b" in the numerals of the latter. In the illustrated example, the tubular member 22b is provided with a rectangular cross-sectional configuration. The engagement member 32b of the delivery apparatus 20b includes a plurality of escapement assemblies 44, each of which include a pair of actuator mechanisms 46 each actuating a pin 48 between an extended position (A), wherein the pin 48 extends into the interior space 26b of the tubular member 22b, thereby preventing the monolith 10 from traveling past the escapement assembly 44 in the direction 34b, and a retracted position (B), wherein the pin 48 is retracted from within the interior space 26, thereby allowing the monolith 10 to slide past the escapement assembly 44.

In operation, the controller 35, 35a, 35b is preferably provided as an air logic circuit that is operably connected to the associated engagement member 32, 32a, 32b. However, the controllers described herein are not limited to air logic circuits, and can instead be any form of controller capable of controlling descent of the monolith. An example of a preferred alternative controller is a gas containing logic controller similar to an air logic controller but wherein at least a portion, and preferably substantially all of the air is replaced by an inert gas such as nitrogen. Preferably, the controller 34, 34a, 34b is programmed so as to provide a controlled descent of the monolith 10 within the interior space 26, 26a, 26b of the tubular member 22, 22a, 22b and prevent a free-fall descent of the monolith, while simultaneously preventing the monoliths 10 from colliding with one another when being delivered through the delivery apparatus 20, 20a, 20b.

As the application of each delivery apparatus 20, 20a, 20b is similar, the description of delivery apparatus 20 should be considered illustrative of each of the delivery apparatus 20, 20a, 20b. As best illustrated in FIG. 2, the delivery apparatus 20 is extended into an interior space 50 of a large-scale trickle bed reactor 52 typically used in a chemical and/or petroleum refinery process, such that the first end 28 of the tubular member 22 of the delivery apparatus 20 is accessible through an opening 54 in the outer housing 55 of the reactor 52, and the second end 30 of the tubular member 22 of the delivery apparatus 20 is located within the interior space 50 of the outer housing 55. Preferably, a plurality of delivery apparatus 20 may be linked together in an end-to-end configuration, thereby allowing the total length of the delivery assembly to be reconfigured as the level of monoliths 10 contained within the reactor 52 changes. During delivery, monoliths 10 are loaded into the delivery apparatus 20 at the first end 28 accessible from the opening 54 of the reactor 52, and removed from within the delivery apparatus 20 at the second end 30 located within the interior space 50 of the reactor 52. The plurality of engagement members 32 prevent a free-fall descent of the monoliths 10 within the delivery apparatus 20, and further prevent contact between the monoliths 10 during the delivery thereof.

The reference numeral 60 (FIG. 9) generally designates another embodiment of the reactor monolith delivery apparatus. In the illustrated example, the delivery apparatus 60 includes a plurality of packaged containers 62 each containing a monolith, preferably heat-sealed or otherwise hermetically sealed therein. The delivery apparatus 60 further includes a flexible member 64 such as the length of rope or cable and along which the containers 62 are attached. However, the invention is not limited to such packaged containers, and the monolith could be attached to the flexible member 64 using other means, for example by adhering the monolith to the flexible member with adhesive, or ultrasonic welding of the flexible member to the monolith, or by using a plastic sleeve that is twisted tightly to hold the monolith in place. Preferably, each container 62 is connected with the flexible member 64 during the heat sealing process by heat sealing each container 62 to the flexible member 64, thereby preventing the container 62 from sliding along the flexible member 64. It is foreseeable that the monolith 10 may be preassembled into groups 66 prior to the packaging thereof into containers 62, thereby eliminating the necessity to assemble each and every individual monolith 10 after delivery into the reactor 52. The monoliths 10 are delivered into the interior space 50 of the reactor 52 by extending one end of the delivery apparatus 60 through the opening 54 in the outer housing 55 of the reactor 52, and slowing lowering the delivery apparatus 60 into the interior space 50. An operator located within the interior space 50 of the reactor 52 receives each of the containers 62 of the delivery apparatus 60 as the flexible member 64 is slowly lowered into the reactor 52, where each container 62 is opened and the monolith 10, or assembly of monoliths 66, is placed within the reactor 52. The delivery apparatus 60 may be manually lowered into the interior space 50 of the reactor 52, or may be lowered via a suitable mechanical system, such as a winch, and/or pulley system. It is foreseeable that the materials as used to construct the containers 62 would be constructed of a biodegradable material, or alternatively a material that dissolves within the chemical or petroleum product to be refined without adversely effecting the same.

In an alternative embodiment, a delivery apparatus 65 comprises a plurality of heat sealed containers 67, wherein each monolith 10 is separated by a divider 68 such as a heat seal, thereby defining each of the containers 67. The monoliths 10 are delivered to within the interior space 50 of the reactor 52 by lowering the delivery apparatus 65 into the reactor 52 in a manner similar to that described above with respect to the delivery apparatus 60.

The reference numeral 70 (FIG. 11) generally designates another embodiment of the reactor monolith delivery apparatus embodying the present invention. In the illustrated example, the delivery apparatus 20 includes a tubular member 72 having an outer wall 74 defining an interior space 76 therein. The tubular member has a first end 78 and a second end 80. In a first embodiment, the delivery apparatus 70 includes a vacuum source 82 operably coupled with the first end 78 of the tubular member 72 and providing a vacuum pressure in a direction 84 as exerted on the monolith 10, thereby preventing a free-fall of the monolith 10 within the interior space 76 of the tubular member 72. In a second embodiment, the delivery apparatus 70 is provided with a pressure source 84 operably coupled with the second end 80 of the tubular member 72 and providing an air pressure in a direction as indicated by directional arrow 86 that acts on the monolith 10, again preventing a free-fall of the monolith 10. The pressure as exerted by the vacuum source 82 and/or the pressure source 84 may be adjusted so as to regulate the rate of decent of the monolith 10 within the delivery apparatus 70.

The methods and related apparatus of the present invention allows efficient and economical delivery of preformed reactor monoliths into the interior space of a reactor while reducing or eliminating damage to the monoliths. Specifically, the present inventive methods reduce costs associated with the installation and removal of the monoliths, while the apparatus are operable by even unskilled workers, can be easily and quickly adjusted, are capable of a long operating life, and are particularly well adapted for the proposed use.

In the foregoing description, it will be readily appreciated by those skilled the art that modifications made be made to the invention without departing from concepts disclosed herein. Such modifications are to be considered included in the following claims, unless these claims by their language expressly state otherwise.

The invention claimed is:

1. A method for delivering a plurality of reactor monoliths into an interior of a reactor, comprising:
   extending at least one tubular member into an interior of a reactor such that a first end of the at least one tubular member is located near an opening in the reactor, and a second end of the at least one tubular member is inserted into the interior of the reactor, said tubular member having an outer wall defining an interior space adapted to allow sliding movement of a reactor monolith therethrough, and a plurality of engagement members located within the interior space of the at least one tubular member and spaced along a length thereof, each engagement member actuable between an extended position and a retracted position; and
   controlling the plurality of engagement members such that each engagement member actuates between the extended position, thereby preventing sliding movement of the monolith through the tube, and the retracted position, thereby allowing the monolith to slide past the engagement member within the tube.

2. The method of claim 1, wherein the controlling step includes controlling the members in a sequential manner, thereby slowly moving the monoliths along the length of the tube and preventing a continuous free-fall descent.

3. The method of claim 2, wherein the controlling step further includes controlling said engagement member via a controller.

4. The method of claim 3, wherein the controller comprises an air logic circuit.

5. The method of claim 1, wherein said at least one tubular member in said extending step includes a plurality of tubular members linked together in an end-to-end orientation.

6. The method of claim 1, wherein the engagement members in said extending step includes a plurality of expandable bladders, and the step of controlling the engagement members includes inflating and deflating the bladders.

* * * * *